Figure 1:
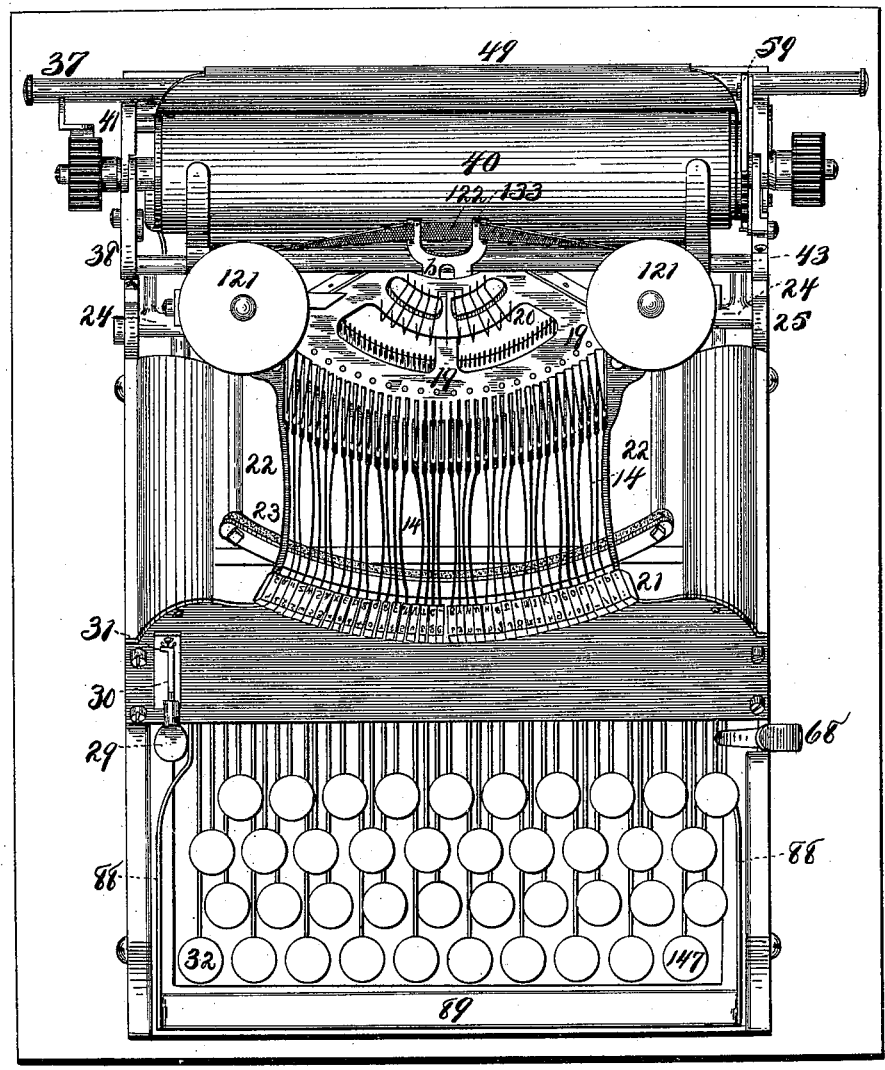

(No Model.)  
9 Sheets—Sheet 1.

E. E. BARNEY.
TYPE WRITING MACHINE.

No. 594,978. Patented Dec. 7, 1897.

WITNESSES:
Charles F. Morin
Mary A. Franklin

INVENTOR
Edwin E. Barney
BY
Smith & Emerson
ATTORNEYS.

(No Model.) 9 Sheets—Sheet 2.

E. E. BARNEY.
TYPE WRITING MACHINE.

No. 594,978. Patented Dec. 7, 1897.

WITNESSES:
Charles W. Morrow
Mary A. Franklin

INVENTOR
Edwin E. Barney
BY
Smith & Knutson
ATTORNEYS.

(No Model.) 9 Sheets—Sheet 3.

E. E. BARNEY.
TYPE WRITING MACHINE.

No. 594,978. Patented Dec. 7, 1897.

WITNESSES:
Charles W. Morvin
Mary A. Franklin

INVENTOR
Edwin E. Barney
BY
Smith A Bridson
ATTORNEYS.

(No Model.) 9 Sheets—Sheet 4.
E. E. BARNEY.
TYPE WRITING MACHINE.
No. 594,978. Patented Dec. 7, 1897.
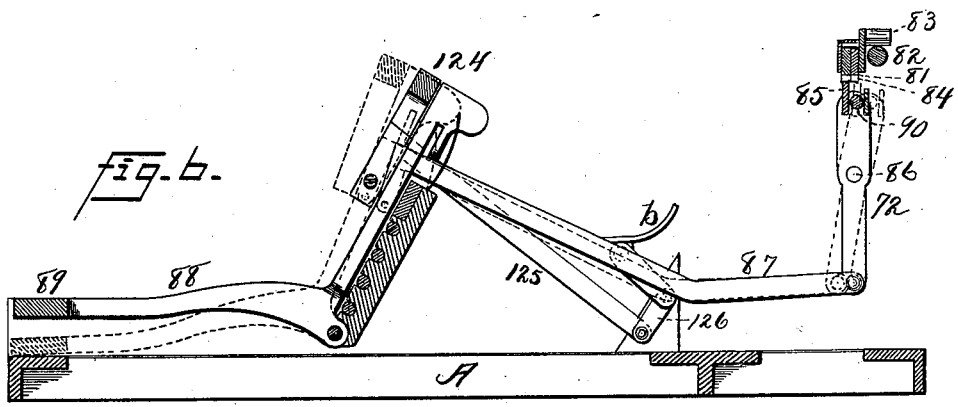
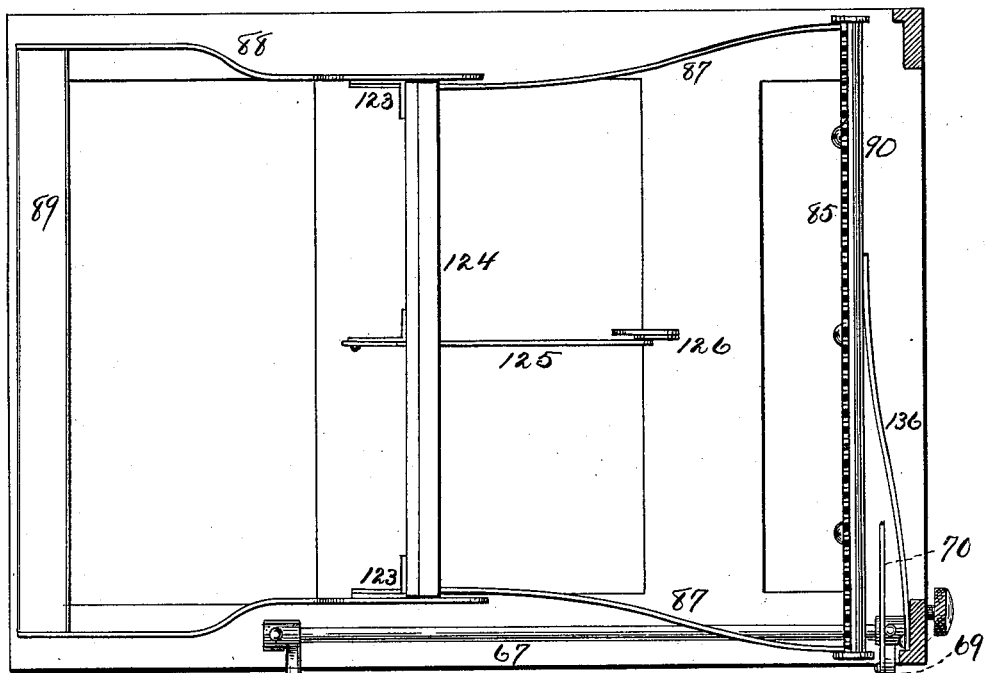
WITNESSES:
Charles W. Morvin
Mary A. Franklin
INVENTOR
Edwin E. Barney
BY
Smith & Aimison
ATTORNEYS.

(No Model.) 9 Sheets—Sheet 5.
E. E. BARNEY.
TYPE WRITING MACHINE.
No. 594,978. Patented Dec. 7, 1897.
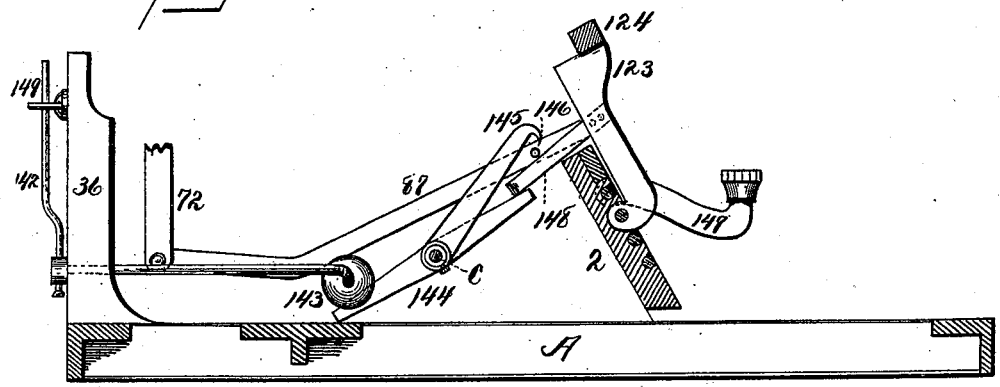
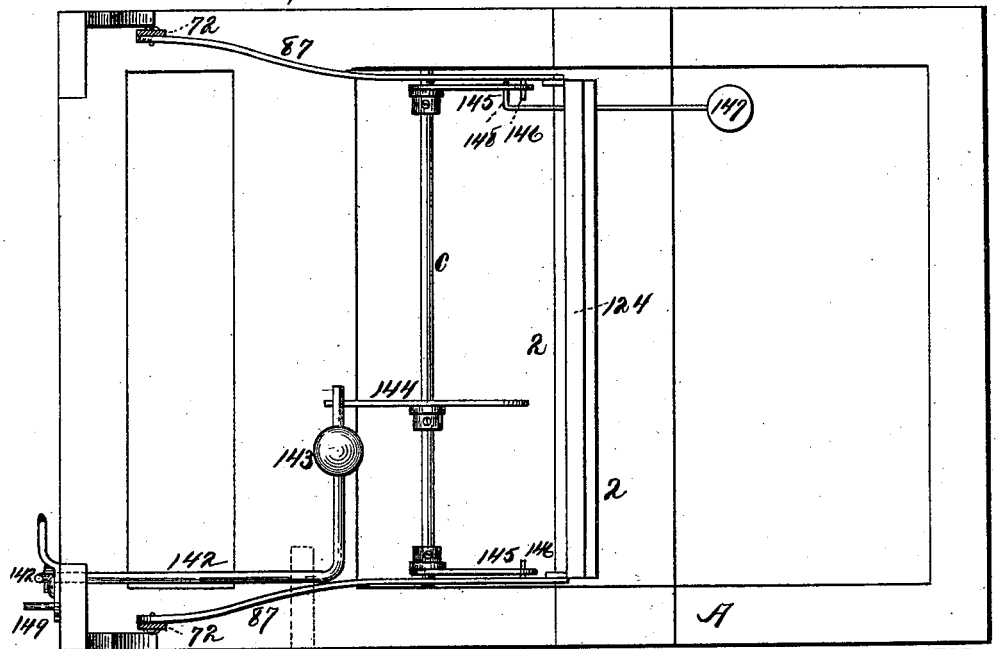
WITNESSES:
Charles W. Morvin
Mary A. Franklin
INVENTOR
Edwin E. Barney
BY
Smith & Brinson
ATTORNEYS.

(No Model.) 9 Sheets—Sheet 6.
E. E. BARNEY.
TYPE WRITING MACHINE.
No. 594,978. Patented Dec. 7, 1897.
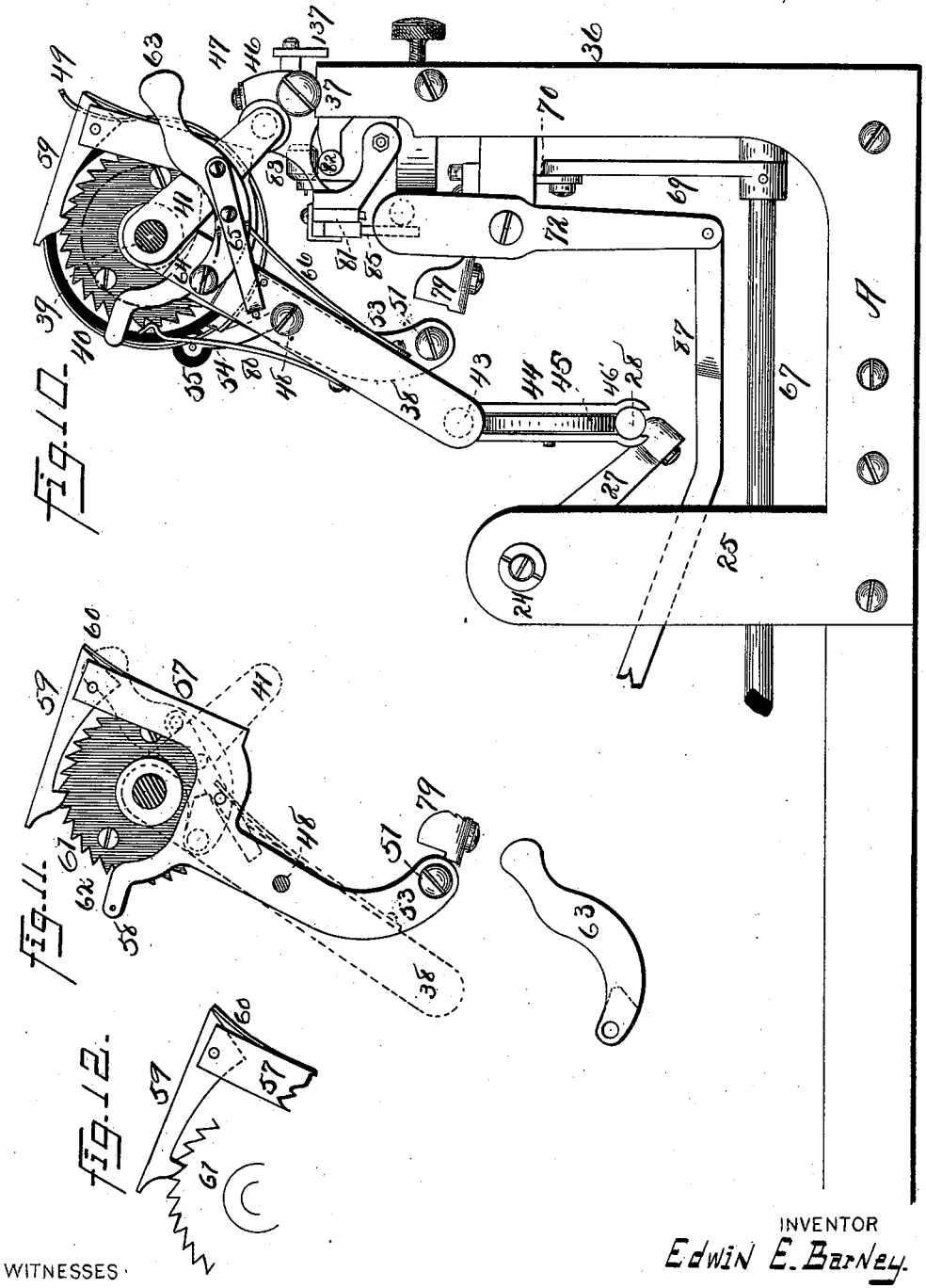
WITNESSES
Charles N. Morvin.
Mary A. Franklin.
INVENTOR
Edwin E. Barney.
BY
Smith & Benson
ATTORNEYS.

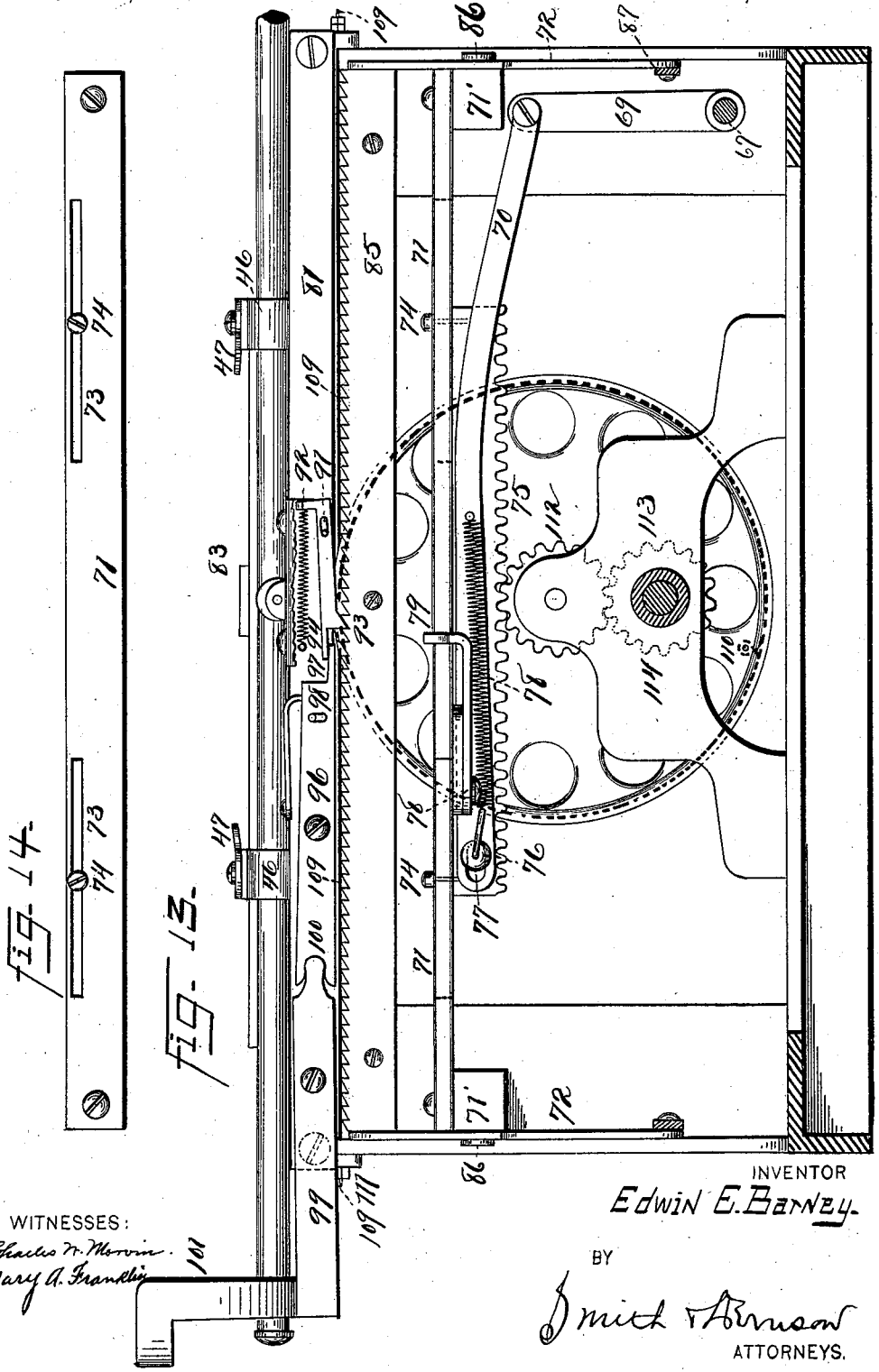

(No Model.) 9 Sheets—Sheet 8.
E. E. BARNEY.
TYPE WRITING MACHINE.
No. 594,978. Patented Dec. 7, 1897.
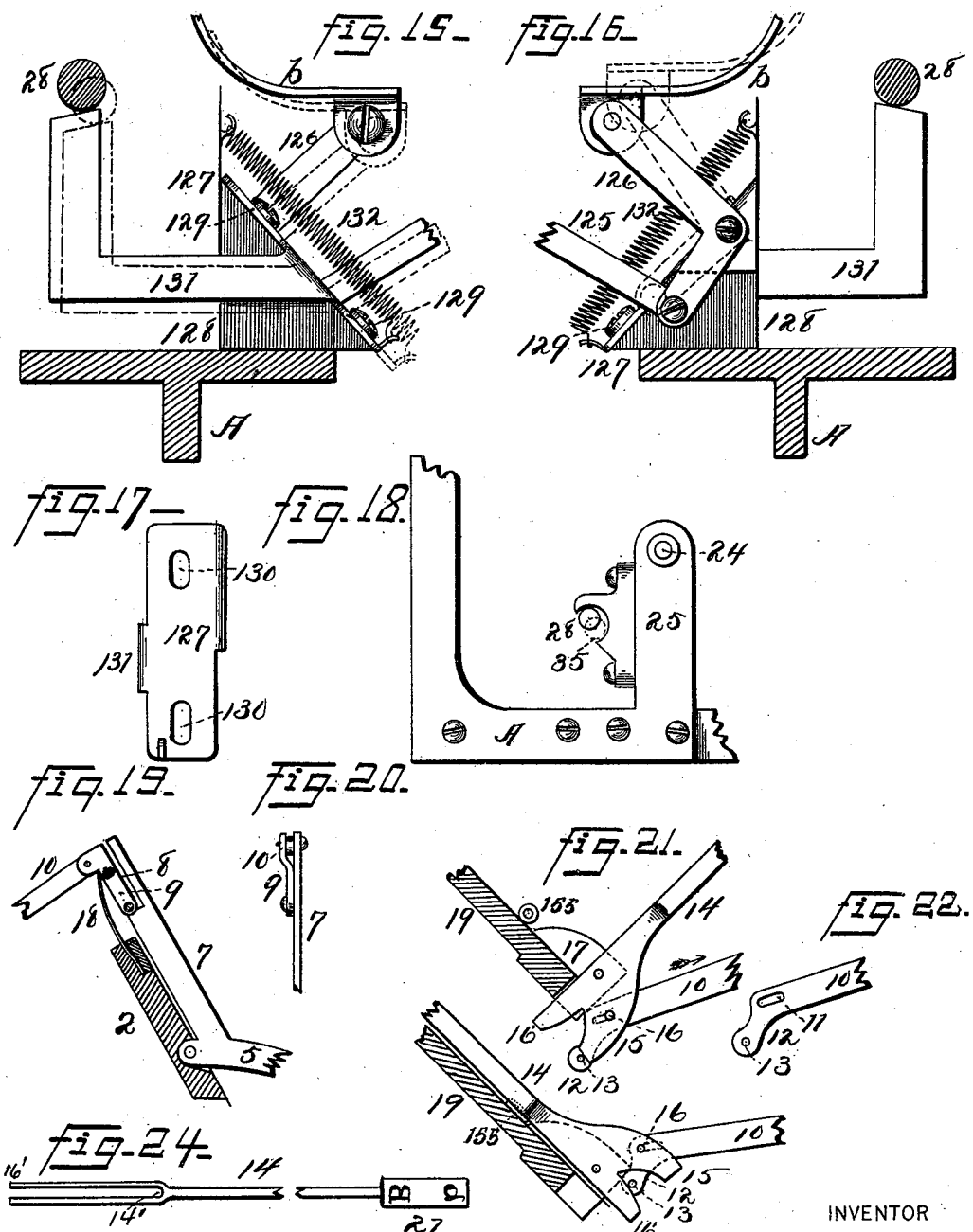
WITNESSES:
Charles W. Morvin
Mary A. Franklin
INVENTOR
Edwin E. Barney
BY
Smith & Brunson
ATTORNEYS.

(No Model.) 9 Sheets—Sheet 9.
E. E. BARNEY.
TYPE WRITING MACHINE.
No. 594,978. Patented Dec. 7, 1897.
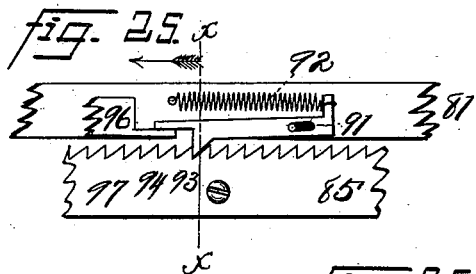
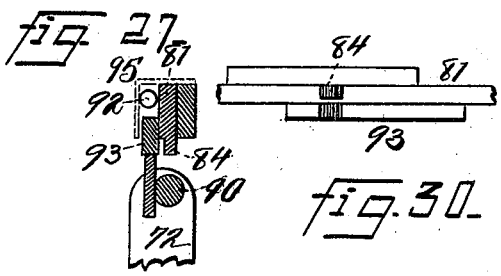
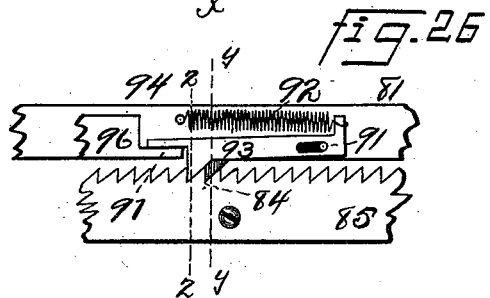
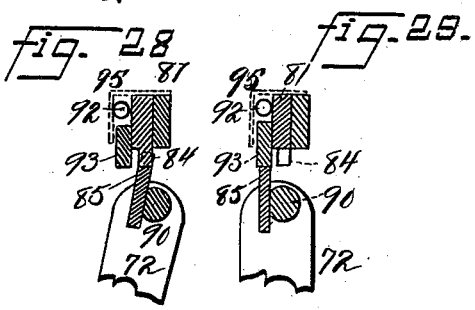
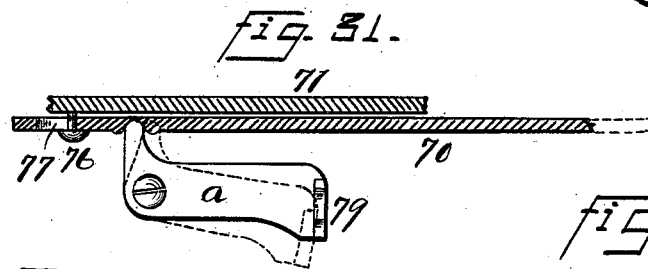
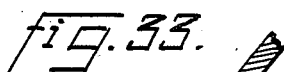
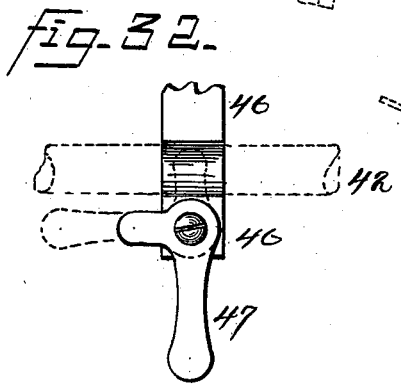
WITNESSES:
Charles N. Morris.
Mary A. Franklin
INVENTOR
Edwin E. Barney.
BY
Smith & Denison
ATTORNEYS.

United States Patent Office.

EDWIN EARL BARNEY, OF GROTON, NEW YORK, ASSIGNOR OF ONE-HALF TO FRANK J. TANNER, OF SAME PLACE.

TYPE-WRITING MACHINE.

SPECIFICATION forming part of Letters Patent No. 594,978, dated December 7, 1897.

Application filed January 11, 1897. Serial No. 618,692. (No model.)

*To all whom it may concern:*

Be it known that I, EDWIN EARL BARNEY, of Groton, in the county of Tompkins, in the State of New York, have invented new and useful Improvements in Type-Writing Machines, of which the following, taken in connection with the accompanying drawings, is a full, clear, and exact description.

My invention relates to type-writing machines, and particularly to that class in which the writing is visible, the printing being done upon the front upper quarter of the cylindrical impression-platen.

My object is to provide such a machine with the following mechanisms, each for a well-known purpose, common to many key-lever center-strike machines, viz: first, a novel key-lever mechanism; second, a novel type-bar; third, a novel type-bar mounting; fourth, a novel platen-mounting; fifth, a novel platen-shift mechanism; sixth, a novel carriage; seventh, a novel carriage-mounting; eighth, a novel spring-wheel connection; ninth, a novel carriage-stop mechanism; tenth, a novel spring mechanism to support the carriage and platen in an elevated position to print capitals.

It also embodies other novel elements, novel combinations of elements, mechanisms, devices, and appliances hereinafter described, and specifically set forth in the claims hereunto annexed.

It is constructed as follows, reference being had to the accompanying drawings, in which—

Figure 2:
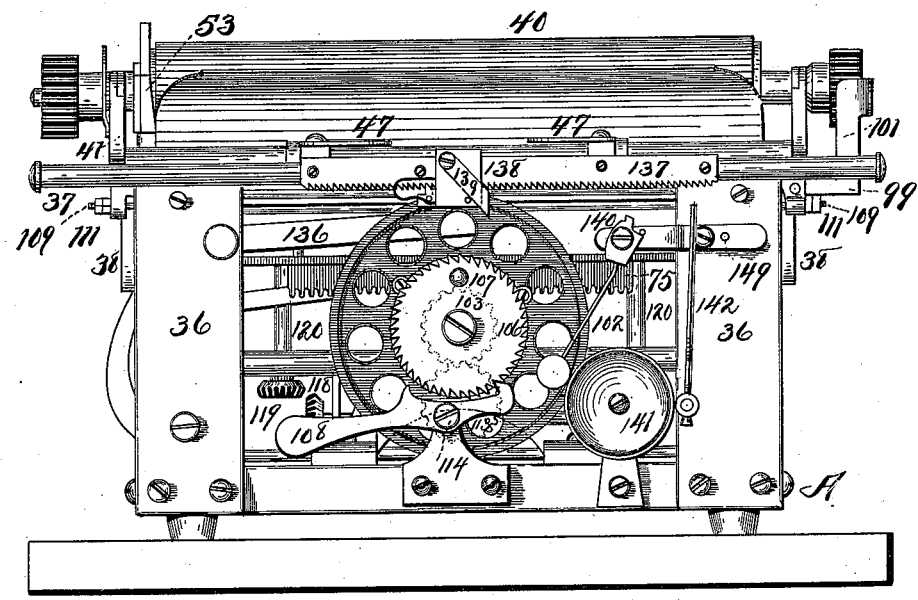
Figure 3:
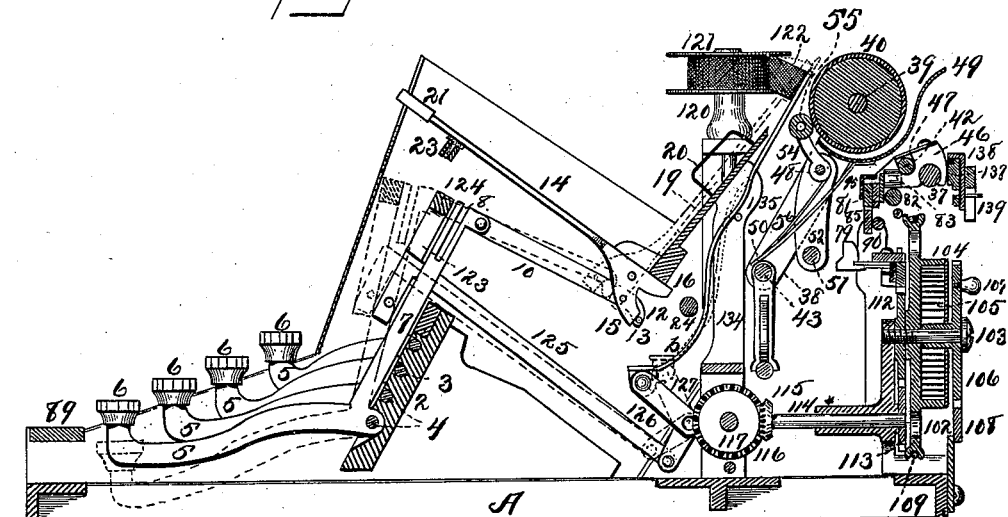
Figure 4:
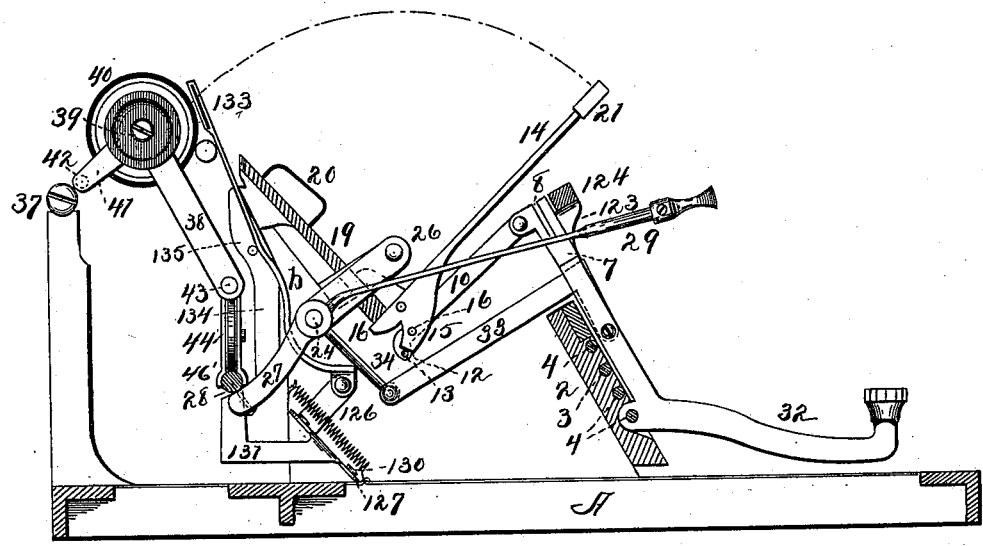
Figure 5:
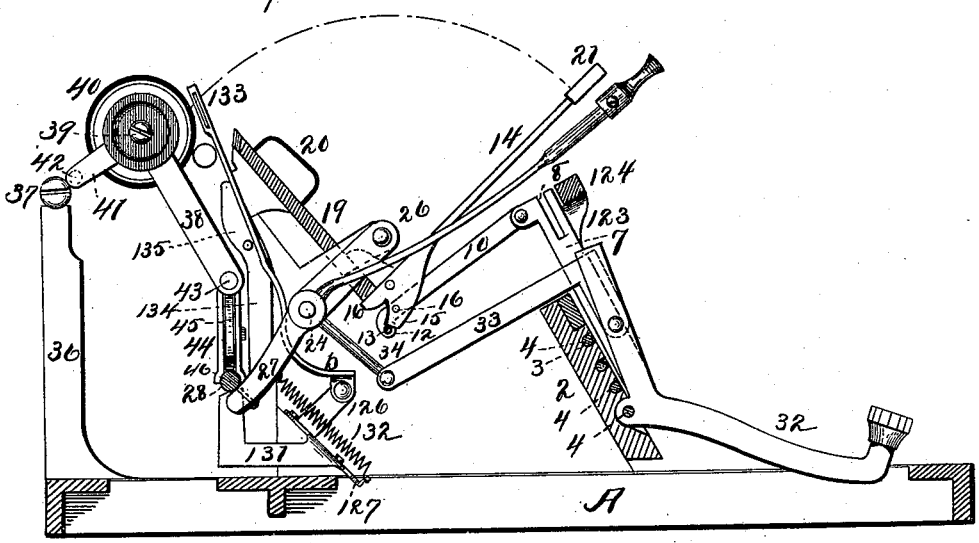

Figure 1 is a top plan of the machine. Fig. 2 is a rear elevation. Fig. 3 is a vertical section on a line transverse to the impression-platen. Fig. 4 is a side elevation of the action, showing the parts in position for printing small letters. Fig. 5 is a like view of the same shifted and set in position for printing capitals. Fig. 6 is a detail of the space-key and escapement. Fig. 7 is a top plan of the same. Fig. 8 is a detail of the release mechanism for printing beyond the end of the line. Fig. 9 is a top plan thereof. Fig. 10 is an enlarged detail of the platen-rotating line-spacing mechanism in its normal position. Fig. 11 is a detail of the same, showing the dog thrown forward upon the rack, and of the lever 63 detached. Fig. 12 is a detail showing the mounting of the line-spacing dog. Fig. 13 is a vertical transverse section showing the carriage, the escapement, the carriage-release, the reciprocating rack for renewing the tension of the spring-wheel, part of the carriage-shifting mechanism, and part of the ribbon-feeding mechanism. Fig. 14 is a top plan of the slotted rail which carries the reciprocating tension-rack. Fig. 15 is an enlarged detail of the mechanism for shifting to upper case, the dotted lines indicating the parts in lower-case position. Fig. 16 is an enlarged detail of the ribbon-shift, the dotted lines indicating the parts in their positions when shifted. Fig. 17 is a top plan of the slide which is operated to shift the carriage or ribbon. Fig. 18 is a detail of the stop which regulates the vertical movements of the carriage and platen to change from lower to upper case, or vice versa. Fig. 19 is a detail of part of a key-lever action. Fig. 20 is a further detail thereof. Fig. 21 is a detail of a type-bar and its mounting and guide, showing the parts at rest. Fig. 22 is a further detail of the end of the rod connecting it to the key-lever crank. Fig. 23 is a like view of the parts shown in Fig. 21, showing them in their position when making an impression. Fig. 24 is a top plan of a type-bar. Fig. 25 is a detail in rear elevation of the escapement and release, showing the carriage stopped. Fig. 26 is a like view of the same, showing the movable dog advanced ready to reëngage with the rack-bar and permit the carriage to be shifted a space. Fig. 27 is a section of Fig. 25 on line X. Fig. 28 is a like view of Fig. 26 on line *y y*, showing the rack-bar in engagement with the stationary dog. Fig. 29 is a like view on line Z Z, showing the rack-bar rocked back into engagement with the movable dog. Fig. 30 is a bottom plan of the carriage-rail and the stationary and movable dogs. Fig. 31 is a sectional detail, partly in top plan, of part of the platen-rotating carriage-shifting mechanism. Fig. 32 is a top plan detailing a carriage-retainer, the dotted lines indicating a rear rail of its frame and also showing the retainer swung around in engagement with said rail. Fig. 33 is an elevation of a type-bar mounting differing somewhat from that elsewhere shown.

A is a suitable base provided with suitable standards and uprights to support and carry the different members, suitable means being provided to inclose some portions thereof.

*Key-lever mechanism*, Figs. 1, 3, 19, and 20.—An inclined upright 2 is erected upon each side of the base, possibly extending from one side across to the other, and is provided with parallel grooves 3, in which bearing-bars 4 are suitably mounted or journaled, upon which the key-levers are mounted, each having a front arm 5, a button 6 thereon, and an upwardly and rearwardly inclined arm 7, provided with a bifurcation 8. Upon this an offset 9 is suitably mounted, creating a space in which a connecting-rod 10 is suitably pivoted. The other end of this rod is provided with a slot 11 and an offset 12, provided with a projecting pin 13, Figs. 22 and 23.

The type-bar 14 is bifurcated longitudinally at its lower end 14', Fig. 24, and is also transversely bifurcated or notched in this end, creating arms 15 and 16'. In the arm 15 the pivot-pin 16 is mounted, passing through the slot 11, Fig. 21, in the rod 10 and connecting it to said type-bar, this pivot being normally in the front end of said slot and the pin 13 being normally in engagement with the arm 15. Each type-bar straddles a fin 17 and is pivoted thereon. When strain is applied to said rod by the striking of a key, the force is primarily applied (as of a lever) to the extremity of the heel (arm 15) of the type-bar, as well as in said slot, starting it more easily, quickly, and sharper. Then this rocking of the type-bar gradually swings said heel out of engagement with pin. For a short distance the force is solely exerted by the pivot 16, and thus full momentum having been given to the type-bar the pivot slides forward in said slot and in conjunction with the then engagement of the pin 13 with the face (or faces) of the arm 16' suddenly stops said type-bar an instant before it strikes its impressive blow, whereby its resultant spring throws its type with a quick sharp blow against the ribbon to make an impression, thus giving great power for manifolding. This resiliency of action thus created by the double-stop fulcrum reacts to throw the type away from the paper and ribbon and prevents blurring. A suitable spring 18, Fig. 19, is brought under tension each time a key is operated and returns the several parts to their normal position. These type-bars are mounted upon the arc of a circle the center of which is the printing-point upon the impression-platen. They are shown as each provided with a capital and a small letter, (or double characters, upper and lower case.)

The quadrant 19 consists of a plate of suitable material, and the fins 17 are mounted thereon in lines radial to the arc of the mounting of the type-bars and are suitably mounted so that they can be properly alined to prevent their binding in the bifurcations of said type-bars, which they also guide in their movements. Upon said quadrant and upon lines radial to the same center, guides 20, Figs. 1, 3, 4, and 5, are mounted, (shown as pieces of wire having their ends secured in it,) being arranged upon an arc of less radius than but concentric with that of the type-bar mountings. The type-bars are shown as arranged in bunches or groups of three or four, so that each one of a group will enter a space between two of these guides and be guided thereby against lateral vibration. It will also be seen that the heads 21 of the type-bars upon which the type or characters are mounted are so mounted as to stand in lines radial to the arc of the guides and quadrant. Suitable rods 22 are erected upon said quadrant at substantially a right angle to it and carry a curved segment 23, against which normally lie said type-bars.

A rock-shaft 24 is suitably journaled in standards 25, Figs. 1 and 18, erected upon the base and provided with arms 26, Figs. 4, 5, and 18, upon which the quadrant is hung, as upon pivots, so that by rocking said shaft, as hereinafter described, said quadrant and type-bars are raised or lowered to shift from lower to upper case, or vice versa. Said rock-shaft is also provided with arms 27, which carry the front rail 28. This shaft can be rocked by raising a spring-lever 29 in the slot 30, Fig. 1, and springing it into a lateral notch 31 at the top of said slot when desired. This raises the quadrant and type-bars to change the case, and also lowers the carriage-rail 28, and they are locked in that position for printing capitals or upper case so long as said lever is retained in said notch or held in its position shown in Fig. 5.

For temporary use, as for printing a single upper-case character or capital, a key-lever 32, Figs. 4 and 5, through a rod 33, connected to it and to an arm 34, secured to said rock-shaft, operates to rotate said shaft and shift said quadrant, type-bars, and carriage-rail. The ends of said rail 28 fit loosely in a notch 35 in a bracket upon each of the uprights 25, Fig. 18, which limits its vertical movements and those of the quadrant, type-bars, and carriage. Upon rear standards 36 a rod 37 is secured, which supports the rear of the carriage.

The carriage, Figs. 4, 5, 10, and 11, comprises the rearwardly-inclined end bars 38, in which the shaft 39 is journaled, upon which the platen 40 is secured. The bars 41 are journaled upon said shaft and extending downwardly and rearwardly, and having their ends connected by a rod 42, which constitutes the rear rail of the carriage, and the lower ends of the bars 38 are connected by a rod 43, which constitutes the front rail of said carriage. Bearing-bars 44 are mounted on the front rail, and 45 is a roller journaled in them and adapted to travel upon the track 28, Figs. 4, 5, and 10. The lower ends of said bars 44 are shown as concaved, as at 46', to partially encircle the track, so that the tread of said roller can be flat and thus travel more freely upon said track. Bearing-blocks 46 are mounted upon the rod 37 and concaved in their upper faces to receive the rail 42, which is retained therein by the buttons 47, and is free to rock in their bearings when the lower track 28 and the entire carriage is raised or lowered. It will be seen that when the quadrant is raised, the carriage and platen are lowered simultaneously therewith, each substantially the same distance equal to one-half of the space between two characters upon a type-bar, and that this imparts a rocking movement to the platen, whereby the plane of the printing-point thereon is unchanged in that the type will always strike it squarely in whatever position it may be raised or lowered.

A rod 48 connects the end bars 38 adjacent to the platen, and a suitable apron 49 is suitably journaled thereon, having its front edge in yielding contact with the platen through the action of the spring 50, as shown in Fig. 3, which engages with the rod 43, and by pulling the top of the apron forward its front edge is swung away from the platen and the spring returns it. A frame comprising a rail 51 and ends 52 53 is hung and adapted to swing upon the rod 48, said rail being usually flattened on its rear side, as shown more especially in Fig. 10. Arms 54, Fig. 3, loose upon said rod 48, carry a shaft upon which the paper-roller 55 is mounted, and a spring or springs 56 hold said roller in yielding contact with the platen. The end 53, Figs. 10 and 11, is provided upon its upper end with a rear arm 57 and a front arm 58, being of substantially the shape shown. The line-spacing dog 59 is pivotally mounted upon the arm 57, having a spring 60 engaging with its heel to hold it in engagement with the ratchet 61 upon the platen. The arm 58 is provided with an inwardly-projecting pin 62, which is brought into engagement with the ratchet as a stop when the frame 51 52 53 is swung. A lever 63, Fig. 10, is secured to a pin 64, which is loosely inserted through the bar 38 and is connected to the bar 38, so that when said lever is operated it will swing the frame to set it for single or double line spacing. A finger 65 is secured to said lever, its free end being adapted to suitably engage with the front recess on bar 38 (small circle at end of finger) for single-line spacing and with another recess (small circle close to lower edge of finger) for double spacing. A spring 66 suitably engages with said finger or lever to prevent accidental shifting. This line-spacing mechanism is operated as follows, Figs. 7, 10, 13, and 14.

A rock-shaft 67 is suitably journaled in or above the base, provided with a hand-crank 68 on its front end, and having a crank-arm 69 adjacent to its rear end, to which a draw-bar 70 is connected, Fig. 13. A beam 71 is mounted upon lugs 71', longitudinally slotted, as at 73, Fig. 14, and the pins 74 through said slots carry the tension-rack 75. A pin 76 through a slot 77 in the draw-bar 70 permits said slide to have a limited "lost-motion" movement for the line-spacing, it being suitably connected to a bell-crank $a$, pivoted under said beam 71, Fig. 31, and a spring 78 holds said slide in its normal position or returns it to it. When said lever is swung outward, said drawbar is drawn to the right and swings the head 79 of said bell-crank out into engagement with the rail 51, swings said frame, and rotates the platen for line-spacing a single or double space, according to the distance said rail is from said head, which is regulated by the lever 63 and the position to which it has rocked said spacing-frame.

A suitable spring-pawl 80, Fig. 10, prevents backward rotation of the platen.

The blocks 46, Fig. 3, extend forward and carry a rail 81, extending across the machine parallel to and a little below the track 37. A stationary auxiliary track 82 is suitably supported in parallelism with and a little below the track 37, and the roller or rollers 83 are suitably connected to the rail 81 and traverse the track 82. The rail 81 is provided with a single escapement-tooth 84, stationary thereon, and said rail, blocks 46, and rollers 83 constitute an auxiliary carriage carried by the rails 37 and 82, the carriage-rail 42 being detachably connected by the buttons 47 to the blocks 46, so that by swinging said buttons this rail is released and the platen and its frame can be lifted out whenever desired. The bars 72, Figs. 6, 7, and 13, carry the escapement-rack 85 upright, with the teeth uppermost, and these bars are pivoted at 86 and adapted to vibrate this rack through the connecting-rods 87, connecting them to the space-keys 88 and space-bar 89. The bars 72 are connected by a rod 90, to which the rack is secured.

Upon the front of the rail 81, Figs. 13 and 25 to 30, the spacing-pawl is mounted by the slot-and-pin connection 91 and the spring 92, connected to the pawl and to said rail. This pawl is provided with a single tooth 93 and with a lip 94. The rocking of the rack disengages the carriage from the pawl-tooth 93 and the rack engages with the tooth 84, as in Fig. 28. Thereupon the spring 92 throws the pawl forward the length of the slot, as in Fig. 26, and the rack, rocked forward, engages with the pawl-tooth, and by the spring-wheel tension the carriage is advanced a single letter-space, the pawl then being in the position shown in Fig. 25. A suitable case 95 incloses said pawl. Upon the rail 81, Fig. 13, a lever 96 is pivoted, having a lip 97 in engagement with the pawl-lip and provided with a slot and pin 98 to regulate its movements. A lever 99 is also pivoted upon said rail, suitably engaging with the lever 96, as at 100, and having a handle 101, whereby when said handle is raised said pawl-tooth is swung upward out of engagement with said rack and the carriage is released for manual shifting, said pawl reëngaging with said rack whenever the pressure is removed from said handle. A spring-wheel 102 is journaled upon a pivot 103, carrying a spring-case 104, inclosing a spring 105, and 106 is a circular tension-rack journaled upon said pivot, having a handle 107 and held at any point by a clacket 108, by which the tension can be varied. The wheel 102 is grooved in its periphery, and a suitable wire 109, as a piano-wire, is wound around it and connected to it, as at 110 in Fig. 13, in which the dotted lines indicate the wire, and the ends thereof are suitably connected to the ends of the carriage, as at 111, so that said wire can be drawn taut, avoiding all lost motion. When the lever is swung for line-spacing and carriage-shifting, the rack 75 is carried to the right, and by its engagement with the gear 112, secured to said wheel, the spring is renewed. This gear, Figs. 3 to 13, drives a pinion 113, shaft 114, bevel-gears 115 116, shaft 117, and suitable bevel-gears 118 upon its ends, one of which meshes with a bevel-gear 119 upon one or the other of the vertical shafts 120, which carry the ribbon-spools 121, on which the ribbon 122 is wound.

Upon suitable arms 123, suitably pivoted in front of the upright 2, as upon one of the bearings 4, a universal bar 124 is mounted in such position as to be engaged and swung forward by every key or space-key. This, Fig. 3, draws the rod 125 forward, swings the bell-crank 126, and raises the ribbon-guide $b$ and brings the ribbon into the path of a type and in front of the printing-point. This bell-crank is pivoted upon a plate 127, Figs. 4, 5, 15, 16, and 17, mounted upon a suitable support 128 by means of the screws 129 and slots 130, which permit a limited reciprocation. Said plate is also provided with an angular arm 131, which engages with the track 28, so that when said track is lowered for upper-case work, as hereinbefore described, said slide will be forced down and the ribbon lowered the same distance as the platen, and when the platen is raised the spring 132 raises the slide and ribbon-guide to their normal positions. When a key is operated to print, the ribbon is raised, and as soon as the pressure is released the spring 132 retracts the guide or assists more or less therein. This guide is bifurcated at its upper end, and each arm is provided with a loop or eye 133, through which the ribbon is passed. A standard 134 guides and supports this guide in its vertical movements, the guide being shown as longitudinally slotted, so as to fit over said standard and bear upon a pin 135 through it. A spring 136, Fig. 7, engages with the rack-bar to return it to its normal position when rocked.

A rack 137, Fig. 2, is secured upon the rail 37, and 138 is a slide mounted thereon carrying a swinging pawl in engagement with the rack which can be adjusted to regulate the end-of-a-line stoppage of the carriage. It carries a tappet 139, which engages with the hammer-stem 140 and rings the bell 141. Passing this it engages with a rod 142, which is pivoted in a standard 36 and extends into the machine, Figs. 8 and 9, and carries a weight 143, which is normally in engagement with a lever 144, suitably secured to a rock-shaft $c$, and 145 is a hooked arm on said shaft adapted to engage with a pin 146 on the rod 87, connected to the universal bar at the normal end of the line, and lock the keys by locking said bar. The engagement of the tappet with the rod 142 raises the weight 143, which permits the hook to fall and lock the bar 124. In order to print one or more characters beyond the normal end of said line, the universal bar is released by depressing the key 147, whereby its arm 148 engages with the hook 145 and raises the hook. The carriage is stopped and the keys locked before the rod 142 is swung into engagement with the stop-pin 149, so that by operating the release-key 147 the carriage can then travel until said rod encounters said stop.

In Fig. 33 I show a little difference in the mounting of a type-bar and its operating mechanism, embodying the same principle of suddenly arresting the swing of a type-bar by bringing it into engagement with the end of the connecting-rod by which it is swung, making said end an abutment. It embodies the mounting of the connecting-rod 150 in a sleeve 151, providing stops 152, which limit the reciprocation in said sleeve, pivoting said sleeve on one arm 153 of the bifurcation of the heel of the type-bar in such relation that the other arm 154 will strike against the end of said rod, as shown in dotted lines, and arrest the swing of the type-bar just before the type strikes the ribbon. The stops are so arranged as to permit the rod to move a fixed distance before it starts the type-bar.

The bifurcation 8 enables me to adjust the members of the action to take up any slack or lost motion therein or any inaccuracies of construction by opening or closing it.

The offset 9 is preferably a spring to enable the rod 10 to be inserted and connected to its pivot-pin or removed therefrom by springing it outward and also to hold said rod in place. It will also be seen, Figs. 21, 22, and 23, that when strain is applied to the rod 10 motion can, when desired, be instantly imparted to the type-bar, the strain being applied to the end of the slot and to the heel also, the pin 16 being in the position shown in Fig. 21. In this case rapid momentum is speedily given to the type-bar and continued up to a certain point, and thereafter the type-bar will finish its stroke by its own momentum, sliding on the pin into the position shown in Fig. 23.

In Figs. 21, 23, and 33 I show a cushion 155 mounted upon the quadrant on a line concentric with the pivots of the type-bars and consisting of a rubber tube, either inflatable or not, or a block of solid rubber, or of any other material possessing sufficient resiliency of action whereby the operation of a type-bar more or less compresses said cushion just before or at the instant of the impression-blow, and the cushion by its resiliency throws the type-bar much more quickly away from the platen, preventing clogging and insuring more rapid work upon the machine.

It will be observed that the slots 8 in the bell-crank key-lever 5 7 are of great value in alining the machine, in taking up any inequality liable to create lost motion and rattling in the rods 10 or the bell-cranks, and is effected by forcing the rear arm of said slot toward or away from the other arm. It will also be seen that the guides 20 by their elongation permit the shank of each type-bar to engage with it first at its lower end and to be guided by it until it strikes the blow and is therefore much more efficient than a pin or stud.

Having described my invention, what I claim, and desire to secure by Letters Patent, is—

1. In a type-writing machine, the combination with a type-bar bifurcated or notched to create two arms upon its lower end, the rod connected to one of said arms, and the key-lever having an angular upward extension to which said rod is also connected, whereby when said lever is operated to swing said type-bar, its other arm will strike against said rod and arrest said type-bar.

2. In a type-writing machine, the combination with a pivoted type-bar bifurcated longitudinally creating diverging arms upon its lower end, of a rod connected to one arm by a slot-and-pin connection, and a key-lever connected to said rod to reciprocate it longitudinally, whereby said type-bar when operated moves independently a fixed distance before striking its blow, and at the same time swings its other arm into engagement with said rod to arrest the swing of said type-bar.

3. In a type-writing machine a quadrant and type-bars mounted thereon, in combination with an impression-platen, its carriage, and a stationary upper track and a vertically-movable lower one and means to raise said quadrant and lower said carriage and platen simultaneously to shift from lower to upper case or vice versa.

4. In a type-writing machine a quadrant and type-bars mounted thereon, in combination with a carriage and impression-platen mounted therein and means to simultaneously shift said quadrant and carriage in opposite directions to shift from one printing-case to another.

5. In a type-writing machine the combination of a vertically-reciprocating carriage, and platen mounted therein, a vertically-reciprocating ribbon-guide and a ribbon mounted therein, and a vertically-reciprocating quadrant and type-bars mounted thereon.

6. In a type-writing machine, a rock-shaft and arms thereon projecting toward the front of the machine in combination with a quadrant mounted upon said arms and type-bars mounted upon said quadrant, a crank-arm secured to said rock-shaft and projecting forward and downward therefrom and means to swing said crank to rotate said shaft to reciprocate said quadrant and type-bars vertically.

7. In a type-writing machine, a rock-shaft, upward and downward arms thereon, in combination with a quadrant mounted upon the upward arms, type-bars mounted upon said quadrant, a carriage-rail mounted upon the downward arms, a carriage mounted upon said track and a stationary track, an impression-platen mounted in said carriage, and means to rock said shaft and shift said quadrant and carriage simultaneously in opposite direction.

8. In a type-writing machine, a rock-shaft having upward and downward arms thereon, a quadrant mounted upon the upward arms, type-bars upon the quadrant, a carriage carried by the downward arms, a platen mounted upon said carriage, in combination with a vertically-reciprocated ribbon-guide and a ribbon mounted therein, and means to reciprocate said quadrant, carriage and ribbon-guide simultaneously to change from one printing-case to another.

9. In a type-writing machine a bank of key-levers, a universal bar mounted and adapted to swing forward and back upon its supporting-arms, a rod connecting it to a bell-crank, a bell-crank connected to a ribbon-guide in combination with a ribbon-guide vertically reciprocated in the same plane by the operation of a key-lever, and its engagement with said bar.

10. In a type-writing machine a bank of key-levers, a universal bar mounted and adapted to swing forward and back upon its supporting-arms, a rod connecting it to a bell-crank, a bell-crank connected to a ribbon-guide in combination with an impression-platen, and a ribbon-guide which is vertically reciprocated in the same plane in front of said platen by the operation of a key-lever, and its engagement with said bar.

11. In a type-writing machine a bank of key-levers, a series of type-bars operatively connected thereto, a universal bar mounted and adapted to swing forward and back upon its arms, a rod connecting it to a bell-crank, and a bell-crank connected to a ribbon-guide, in combination with an impression-platen, and a ribbon-guide which is vertically reciprocated in the same plane into and out of the path of the type of each type-bar by the operation of a key-lever, and its engagement with said bar.

12. In a type-writing machine the combination with the impression-platen and its carriage mounted upon and traversing suitable tracks and a tappet upon said carriage, of a rock-shaft having an arm in position to be engaged by said tappet, a counterbalance-weight upon said shaft and a pivoted shaft carrying an arm and a hook the weight engaging the arm normally holding said hook up, and releasing it when said tappet engages with said shaft-arm to raise said weight.

13. In a type-writing machine a swinging universal bar, a series of key-levers each adapted to swing said bar, a traversing carriage, and a tappet thereon, in combination with a weighted rock-shaft, a key-locking hook normally held open by the weight on said shaft, and released by the engagement of said tappet with the arm of said shaft, whereby said weight is raised and said hook released to fall and lock said universal bar.

14. In a type-writing machine the combination with a universal bar adapted to be swung upon its mounting, and a gravity locking-hook engaging with it, of a key-lever having an arm which engages with said hook to raise it, and release said bar when said lever is operated.

15. In a type-writing machine, a traversing carriage and a platen mounted therein, and provided with a ratchet, a swinging arm on said carriage provided with a pawl engaging with said ratchet, in combination with a swinging lever having a limited movement, a rock-shaft adapted to be manually rocked, and intermediate connections whereby said lever is swung and the platen is rotated for line-spacing by the partial rotation of said shaft, and said carriage retracted by its further rotation.

16. In a type-writing machine the combination with the carriage, and spring-wheel connected thereto, of a pinion upon said wheel, a rack engaging therewith, and a lever mechanism extending to the front of the machine whereby said carriage is drawn back into position to start a line of printing.

17. In a type-writing machine, the combination with the carriage, and spring-wheel connected thereto, of a pinion upon said wheel, a traversing rack engaging therewith, a draw-bar connected thereto, a crank-arm connected to said draw-bar and a rock-shaft whereby the carriage is retracted by the rocking of said shaft.

18. In a type-writing machine the combination with a traversing carriage, a platen mounted thereon, a ratchet thereon, and a line-spacing pawl engaging with said ratchet and mounted upon a swinging lever, of a bar across the machine, a bell-crank lever mounted thereon, a draw-bar connected thereto, a crank-arm connected to said draw-bar, and a rock-shaft whereby said bell-crank is swung and the platen rotated for line-spacing.

19. In a type-writing machine, the combination with a traversing carriage, a platen mounted thereon, a ratchet thereon, and line-spacing pawl engaging with said ratchet and mounted upon a swinging lever, of a bar across the machine, a bell-crank mounted thereon, a rack-bar suspended from and traversing said bar, a draw-bar connected thereto by a "lost-motion" connection and engaging with said bell-crank, a crank-arm connected to said draw-bar, a rock-shaft carrying said crank-arm, a spring-wheel connected to said carriage, and a pinion on said wheel engaged by said rack, whereby the rotation of said shaft first rotates the platen for line-spacing and thereafter retracts the carriage.

20. In a type-writing machine a traversing carriage, a spring-wheel connected to both ends thereof, and a pinion upon said wheel, in combination with a traversing rack-bar engaging with said pinion and means to retract said rack-bar and thereby retract said carriage.

21. In a type-writing machine, a main frame a quadrant and type-bars mounted to be vertically reciprocated thereon in combination with a carriage-frame, and an impression-platen mounted to be vertically reciprocated therein, substantially in equipoise with said quadrant and type-bars.

22. In a type-writing machine a carriage, a platen-frame connected thereto, and a platen mounted in said frame, in combination and substantially in equipoise with a quadrant and type-bars mounted thereon, a key-lever and intermediate actuating mechanism connected to said quadrant whereby the downward movement of said quadrant raises said platen and frame.

23. In a type-writing machine, the combination with a quadrant, type-bar-guiding fins mounted thereon in radial lines, and elongated type-bar guides mounted upon its upper portion creating converging slots, of bifurcated type-bars mounted astride of said fins and doubly guided by them and by the converging walls of said slots when operated by a suitable key-lever action.

24. In a type-writing machine the combination with a suitably-mounted type-bar, and a rod connected to its heel, of a bell-crank key-lever slotted to create arms to one of which said rod is connected, and whereby the relations of said lever and rod to each other can be adjusted.

25. In a type-writing machine the combination with a type-bar suitably mounted upon a fulcral bearing, forked below said bearing, of a rod directly connected to one arm of said type-bar to operate it, and engaging with it for a part of its movement and engaging with the other arm thereof at the end of said movement.

In witness whereof I have hereunto set my hand this 19th day of December, 1896.

EDWIN EARL BARNEY.

In presence of—
  E. GRACE VORHIS,
  J. BENJAMIN LOREY.